United States Patent [19]
Wildgen

[11] Patent Number: 5,559,287
[45] Date of Patent: Sep. 24, 1996

[54] DEVICE FOR REDUCING DRIFT IN MEASURING INSTRUMENTS

[75] Inventor: Andreas Wildgen, Nittendorf, Germany

[73] Assignee: Siemens Aktiengesellschaft, Munich, Germany

[21] Appl. No.: 531,888

[22] Filed: Sep. 22, 1995

Related U.S. Application Data

[63] Continuation of Ser. No. 251,570, May 31, 1994, abandoned.

[30]  Foreign Application Priority Data

May 28, 1993 [DE] Germany .......... 43 17 952.5

[51] Int. Cl.$^6$ ................................... G01P 5/00
[52] U.S. Cl. ................ 73/204.21; 73/118.2
[58] Field of Search ............ 73/118.2, 204.21, 73/202.5; 374/144, 209

[56]  References Cited

U.S. PATENT DOCUMENTS

| | | | |
|---|---|---|---|
| 4,412,449 | 11/1983 | Eiermann et al. | 73/204.21 |
| 4,785,662 | 11/1988 | Ohta et al. | 73/118.2 |
| 4,856,328 | 8/1989 | Johnson | 73/204.21 |
| 4,981,035 | 1/1991 | Hall | 73/204.21 |
| 5,113,577 | 5/1992 | Wildgen . | |

FOREIGN PATENT DOCUMENTS 3515206  10/1985  Germany .

Primary Examiner—Robert Raevis
Attorney, Agent, or Firm—Herbert L. Lerner; Laurence A. Greenberg

[57]  ABSTRACT

An electrical measuring instrument, in particular an air flow rate meter in an internal combustion engine, which is exposed to a flowing medium, has a mount, a substrate retained in the mount, terminals, and a temperature-dependent measuring resistor disposed on the substrate between two of the terminals. The substrate has a side at which the medium strikes the measuring resistor. A device for drift reduction in the electrical measuring instrument includes an obstruction disposed upstream of the substrate at the side at which the medium strikes the measuring resistor. The obstruction interrupts a dirt film developing between the terminals.

4 Claims, 1 Drawing Sheet

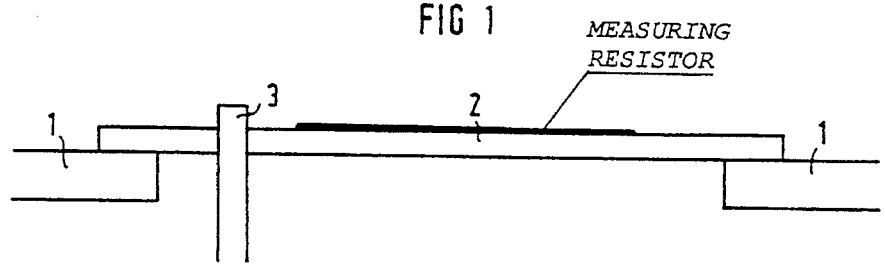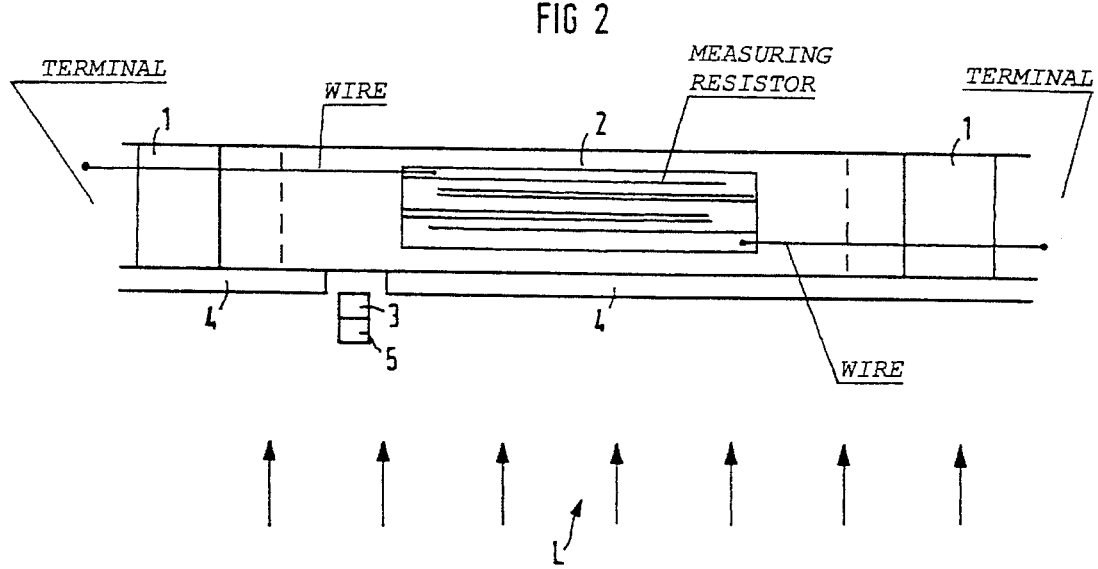

DEVICE FOR REDUCING DRIFT IN MEASURING INSTRUMENTS

This application is a continuation of application Ser. No. 08/251,570, filed May 31, 1994, now abandoned.

BACKGROUND OF THE INVENTION

1. Field of the Invention

The invention relates to a device for reducing drift in an electrical measuring instrument being exposed to a flowing medium, especially in an air flow rate meter for internal combustion engines, wherein the measuring instrument has a temperature-dependent measuring resistor located between two terminals on a substrate that is retained in a mount.

When electrical measuring instruments are exposed to a flowing medium, such as air, for instance in order to measure the temperature thereof, deposits in the form of a film of dirt develop on these measuring instruments over time and can lead to a shift (drift) in the characteristic curve of the measuring instrument, if the measuring instrument, for instance, includes a resistor film disposed on a substrate. Particularly with high-impedance components, such a deposit creates parallel resistors, because especially in internal combustion engines, most of the components of the dirt in the air are electrically conductive soot.

For this reason, various provisions have been employed in an attempt to prevent deposits in the form of a dirt film on such a measuring instrument.

As a representative example of such provisions, a body facing into the flow direction has been disposed upstream of an air flow rate meter disposed in the measuring channel. The body places the measurement range of the air flow rate meter in a shadow, as it were, in order to prevent the flow from directly striking it. A deposition of dirt can be at least partially avoided in that way.

As mentioned above, dirt deposits lead to parallel resistors. In turn, that results in particular in a change in the resistance between the anode and the cathode of the measuring instrument. That effect is reinforced by the moisture in the air. Over relatively long operation or in the event of major soiling, as in the case in Diesel engines, the dirt combined with the moisture from the air causes electrolysis to occur between the terminal contacts (anode, cathode). Particularly in the case of platinum resistors at the terminal contacts, it causes them to separate from the substrate, and therefore the functional reliability of the measuring instrument is no longer assured.

SUMMARY OF THE INVENTION

It is accordingly an object of the invention to provide a device for reducing drift in measuring instruments, which overcomes the hereinafore-mentioned disadvantages of the heretofore-known devices of this general type, in which the aforementioned adulteration of measurement results from drifting in the resistances is at least substantially reduced and in which separation of the terminal points from the substrate is prevented.

With the foregoing and other objects in view there is provided, in accordance with the invention, in an electrical measuring instrument, in particular an air flow rate meter in an internal combustion engine, being exposed to a flowing medium and having a mount, a substrate retained in the mount, terminals, and a temperature-dependent measuring resistor disposed on the substrate between two of the terminals, the substrate having a side at which the medium strikes the measuring resistor, a device for drift reduction in the electrical measuring instrument, comprising an obstruction disposed upstream of the substrate at the side at which the medium strikes the measuring resistor, the obstruction being dimensioned and disposed upstream of the substrate in such a way that as a result it interrupts a dirt film developing between the terminals.

In accordance with another feature of the invention, the obstruction is a sheet-metal strip.

In accordance with a concomitant feature of the invention, the side of the substrate at which the medium strikes the measuring resistor is a longitudinal side, and the sheet-metal strip has a narrow side being disposed approximately transversely to the longitudinal side.

In order to attain high response sensitivity, as is desirable, for instance, for air flow rate meters in internal combustion engines, the measuring instrument is generally exposed directly to the flowing medium. A provision for preventing electrolysis, which provision is still barely tolerable, includes applying an at least partial layer of protective lacquer. That application cannot be automated, therefore it is expensive, and opportunities for mistakes are rife. Drift is reduced only if lacquering is performed as far as the next insulator, but as a rule that requires special constructions.

If the flow has an unequivocal preferential direction, then as experiments have shown, it suffices for the dirt coating to be interrupted at one point. This interruption can be made very simply and virtually in cost-neutral fashion by means of the obstruction disposed upstream of the substrate.

Other features which are considered as characteristic for the invention are set forth in the appended claims.

Although the invention is illustrated and described herein as embodied in a device for reducing drift in measuring instruments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, side-elevational view of essential parts of an air flow rate meter; and FIG. 2 is a fragmentary plan view of the configuration of FIG. 1.

DESCRIPTION OF THE PREFERRED EMBODIMENTS

Referring now in detail to the figures of the drawing as a whole, there is first seen a mount 1, which may be formed from a material with poor thermal conduction, such as plastic or glass. Joined to the mount 1 is a substrate 2, which by way of example may be a ceramic, on which a temperature-dependent measuring resistor is mounted. The temperature-dependent measuring resistor is formed of resistor elements that are joined, for instance by wires, to terminal points disposed on the mount. An obstruction 3 in the form of a narrow strip of sheet metal is provided upstream of the substrate 2 for the temperature-dependent measuring resistor, in the vicinity of a mount. The sheet metal obstruction 3 protrudes past the substrate at least on the side of the measuring region and is narrow in comparison with its length.

Flowing medium arriving at an air flow rate meter is represented by arrows L. From this illustration one can see that the obstruction 3 is located on the side of the substrate 2 facing into the flowing medium.

As a result of contamination in the flowing medium, a film of dirt 4, 5 settles on both the substrate 2 and the obstruction 3 over relatively long operation of the air flow rate meter. As FIG. 2 shows, the dirt film 4 on the substrate 2 is interrupted in the region of the obstruction 3, so as to attain the object which was stated at the outset, namely the prevention of parallel resistors on the substrate between the terminal points and therefore the prevention of drift.

I claim:

1. In an electrical measuring instrument being exposed to a flowing medium and having a mount, a substrate retained in the mount, terminals disposed on the mount, and a temperature-dependent measuring resistor disposed on the substrate and electrically connected between two of the terminals, the substrate having a side facing into the flowing medium, a device for drift reduction in the electrical measuring instrument, comprising an obstruction disposed upstream of the substrate at the side at which the medium strikes the measuring resistor, said obstruction preventing the development of a dirt film between the terminals, which would otherwise create a parallel resistor connected between the terminals.

2. The device according to claim 1, wherein said obstruction is a sheet-metal strip.

3. The device according to claim 2, wherein the side of the substrate at which the medium strikes the measuring resistor is a longitudinal side, and said sheet-metal strip has a narrow side being disposed approximately transversely to the longitudinal side.

4. In an air flow rate meter being exposed to a flowing medium in an internal combustion engine and having a mount, a substrate retained in the mount, terminals disposed on the mount, and a temperature-dependent measuring resistor disposed on the substrate and electrically connected between two of the terminals, the substrate having a side facing into the flowing medium, a device for drift reduction in the air flow rate meter, comprising an obstruction disposed upstream of the substrate at the side at which the medium strikes the measuring resistor, said obstruction preventing the development of a dirt film between the terminals, which would otherwise create a parallel resistor connected between the terminals.

* * * * *